United States Patent [19]

Takeda et al.

[11] Patent Number: 5,422,551
[45] Date of Patent: Jun. 6, 1995

[54] SAFETY DEVICE AND METHOD FOR POWER WINDOW

[75] Inventors: Hitoshi Takeda; Keiichi Tajima; Toru Nakayama, all of Shizuoka, Japan

[73] Assignee: Koito Manufacturing Co., Ltd., Tokyo, Japan

[21] Appl. No.: 62,769

[22] Filed: May 18, 1993

[30] Foreign Application Priority Data

May 23, 1992 [JP] Japan .................. 4-155747
Jun. 2, 1992 [JP] Japan .................. 4-044076 U

[51] Int. Cl.$^6$ ............................................. E05F 15/10
[52] U.S. Cl. ................................. 318/265; 318/285; 318/434; 318/466; 318/630; 49/26
[58] Field of Search ............... 318/255, 256, 257, 260, 318/263, 264, 265, 266, 268, 271, 272, 283, 285, 286, 287, 434, 452, 456, 466, 467, 468, 469, 279, 630; 49/26, 28, 29, 30

[56] References Cited

U.S. PATENT DOCUMENTS

| | | | |
|---|---|---|---|
| 3,644,811 | 2/1972 | Robbins | 318/266 |
| 4,220,900 | 9/1980 | Mintz | 318/266 |
| 4,585,981 | 4/1986 | Zintler | 318/615 |
| 4,641,067 | 2/1987 | Iizawa et al. | 318/287 |
| 4,672,278 | 6/1987 | Ingraham et al. | 318/283 |
| 4,900,994 | 2/1990 | Mizuta | 318/283 |

FOREIGN PATENT DOCUMENTS

| | | |
|---|---|---|
| 3303590 | 8/1984 | Germany . |
| 3829405 | 3/1990 | Germany . |
| 2121988 | 1/1984 | United Kingdom . |
| 2198860 | 6/1988 | United Kingdom . |
| 2221769 | 2/1990 | United Kingdom . |

Primary Examiner—Bentsu Ro
Attorney, Agent, or Firm—Sughrue, Mion, Zinn, Macpeak & Seas

[57] ABSTRACT

A safety device for a power window which, if one's hand or neck is caught between the window glass and the sash, detects such state instantaneously and accurately to perform a safety control operation. Respective detectors detect the absolute and relative speeds of a power window opening or closing operation to determine whether or not a foreign object is caught in the window. When at least one of the detectors detects a foreign object being caught in the window, a safety control operation is carried out, for instance, stopping the movement of the window glass. Since the absolute speed and the relative speed are utilized in combination, a dangerous state can be detected instantaneously and accurately. Also, backlash in the drive mechanism for the window can be detected, and the safety control operation inhibited during such times to prevent erroneously effecting a safety control operation.

8 Claims, 7 Drawing Sheets

SAFETY CONTROL REGION

SAFETY DEVICE AND METHOD FOR POWER WINDOW

BACKGROUND OF THE INVENTION

The present invention relates to a power window of a vehicle such as an automobile which is opened and closed by a drive source such as an electric motor, and more particularly to a safety device for and a method for operating such a power window which, when a person's hand, head, etc., is caught between the window glass and the sash, detects such fact to perform a safety control operation.

In general, a power window of a vehicle is operated (opened and closed) by an electric motor or the like. Sometimes the hand or head of the driver or passenger or some other object (collectively hereinafter referred to as "a foreign object" when applicable) may be caught between the window glass and the sash. In order to prevent such an accident, there has been provided a safety device, which detects a foreign object caught in the window and immediately stops the movement of the window glass or moves the window glass so as to open the window, thereby to prevent the occurrence of an accident.

To this end, the safety device employs a detecting device for detecting the drive current of the electric motor which drives the window glass. When a foreign object is caught between the window glass and the sash, the load on the motor increases, and therefore the current of the motor also increases. The increased current is detected by the aforementioned detecting device. Upon detection of the foreign object, the window glass is forcibly moved to open the window, thereby to release the foreign object.

However, in the above-described safety device where an increase in motor current is utilized for detecting the fact that a foreign object is caught by the window glass, in practice there is a finite time lag between the occurrence of a dangerous state and the detection of the increase in motor current. Therefore, the detecting method suffers from a problem that the safety control operation is slow in response; that is, when the dangerous situation occurs, the safety control operation can only be carried out after a certain time delay. Hence, for instance, if someone's neck is caught between the window glass and the sash, the person is apt to suffer pain for several seconds. Thus, the conventional detecting method is not entirely satisfactory.

Also, the present applicants have previously proposed a safety device in which the rate of change of the speed of rotation of the motor is detected, that is, the relative speed of the motor is detected. When the relative speed falls below a predetermined value, it is determined that a foreign object has been caught in the window, whereupon the motor is stopped or rotated in the opposite direction to forcibly move the window glass in the window opening direction.

In an ordinary power window system, the torque of the motor is transmitted through a gear mechanism or the like to the window glass, and therefore backlash may occur at the start of the motor. In this case, at the start of the motor the speed of rotation of the motor is momentarily increased and then abruptly decreased. Hence, the above safety device which detects a decrease in relative motor speed to perform the safety control operation sometimes can erroneously detect that a foreign object has been caught in the window, and in response to this erroneous detection erroneously effect a safety control operation.

SUMMARY OF THE INVENTION

Accordingly, an object of the invention is to provide a safety device for and a method of operating a power window which, when a foreign object is caught between the window glass and the sash, is able to detect such state immediately.

A further object of the invention is to provide a safety device for a power window which performs a safety control operation correctly, being free from the difficulty of erroneous detection at the start of the motor due to backlash.

In accordance with the above and other objects, the invention provides a safety device for a power window comprising means for detecting the absolute speed of the window glass during a moving operation to detect the absolute speed when a foreign object is caught by the window glass, means for detecting the relative speed of the window glass during its moving operation to detect the relative speed of the window glass when a foreign object is caught by the window glass, and means for performing a safety control operation according to the result of detection of either one of the absolute speed and relative speed.

The safety device further comprises means for generating pulse signals in association with the window glass moving operation, the pulse signals being utilized for detection of the absolute speed and relative speed of the window glass.

The inventive safety device may yet further comprise means for detecting the position of the window glass to discriminate a safety control region, the safety control operation being performed when a foreign object is detected in the safety control region.

In accordance with a safety device for a power window of a second embodiment of the invention, the speed of operation of the drive source used to open and close the window is detected to determine whether or not a foreign object is caught in the window, thereby to perform a safety control operation, wherein, according to the invention, the safety control operation is stopped or suppressed for a predetermined period of time following the time the drive source is started.

Preferably, backlash occurring in the drive source at the start of the latter is detected, and the safety control operation is stopped while backlash is occurring in the drive source. A reference value provided for detection of a foreign object being caught in the window is decreased for a predetermined period of time starting from the time of termination of the backlash, or until after the window glass has moved through a predetermined distance.

DESCRIPTION OF THE PREFERRED EMBODIMENTS

Figure 2:
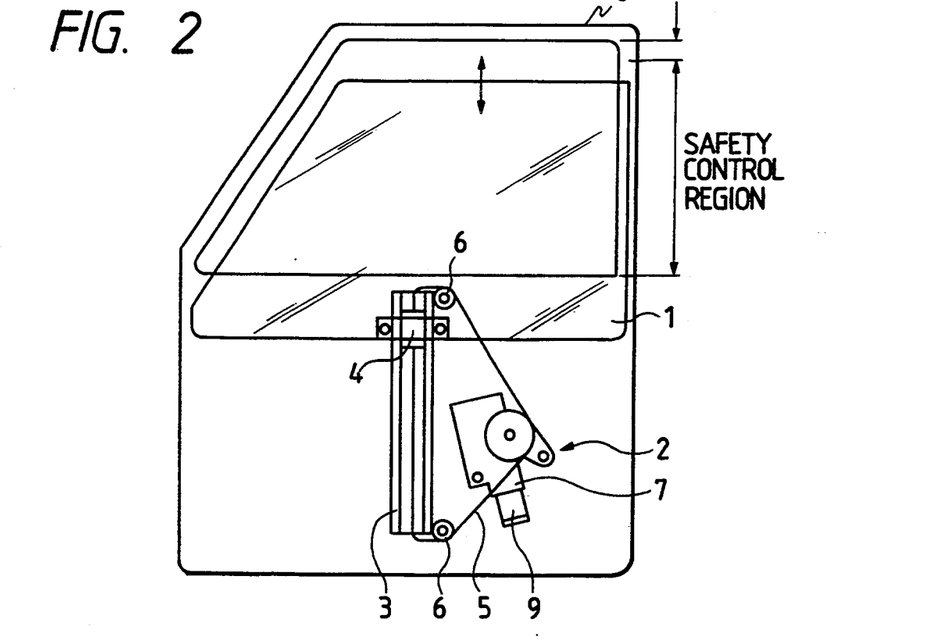
FIG. 2 is an explanatory diagram showing the overall arrangement of a power window to which the technical concept of the invention is applied, and a safety control operation region.

The invention will be described with reference to the accompanying drawings. FIG. 2 is an explanatory diagram showing a power window to which the technical concept of the invention is applied. A window glass 1 is moved by a window glass moving mechanism 2 to open or close the window. The mechanism 2 is provided in the vehicle body below the window. A rail 3 mounted vertically with respect to the vehicle body slidably holds a slider 4. The slider 4 is connected to a wire 5, which is laid over a pair of pulleys 6 provided at the upper and lower ends of the rail 3, and then connected to a power window drive section 7.

When the power window drive section 7 is activated, the slider 4 is moved vertically by the wire 5. The slider 4 is connected to the window glass 10. Hence, when the window glass 1 is moved vertically together with the slider 4, it opens or closes the window space defined by a sash 8.

The power window drive section 7 includes an electric motor 9 as its power source. The torque of the motor 9 is used to drive the wire 5, thereby to move the window glass 1 vertically up and down. For instance, when the motor is rotated in the forward direction, the window glass 1 is moved upwardly to close the window, and when the motor is rotated in the reverse direction, the window glass 1 is moved downward to open the window.

Figure 3:
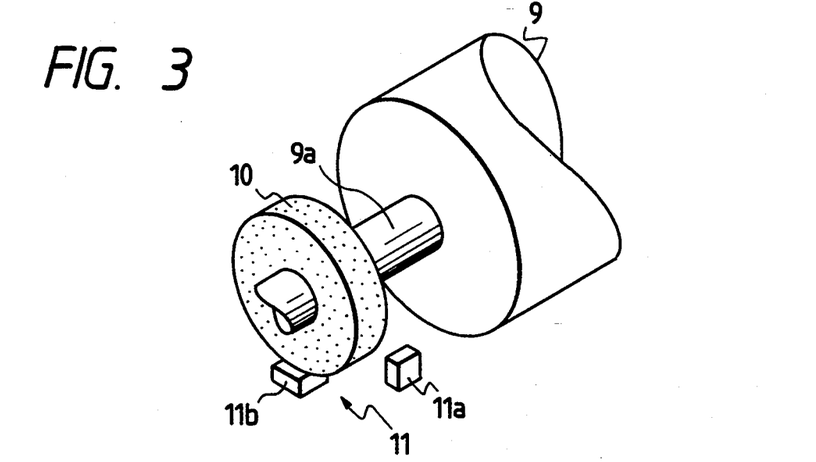
FIG. 3 is an explanatory diagram showing a pulse signal generator which generates pulse signals as an electric motor rotates.

As shown in FIG. 3, an annular magnet 10 is fixedly mounted on the rotary shaft 9a of the motor 9, and a pair of Hall elements 11a and 11b are arranged around the magnet 10 in such a manner that they are shifted from each other by 90 degrees in angular position. The Hall elements 11a and 11b form a pulse signal generator 11. The Hall elements 11a and 11b detect the poles of the magnet 10 to generate currents. That is, when the magnet 10 is rotated by the motor 9, the Hall elements 11a and 11b output pulse signals having a frequency corresponding to the speed of rotation of the magnet.

Figure 4:
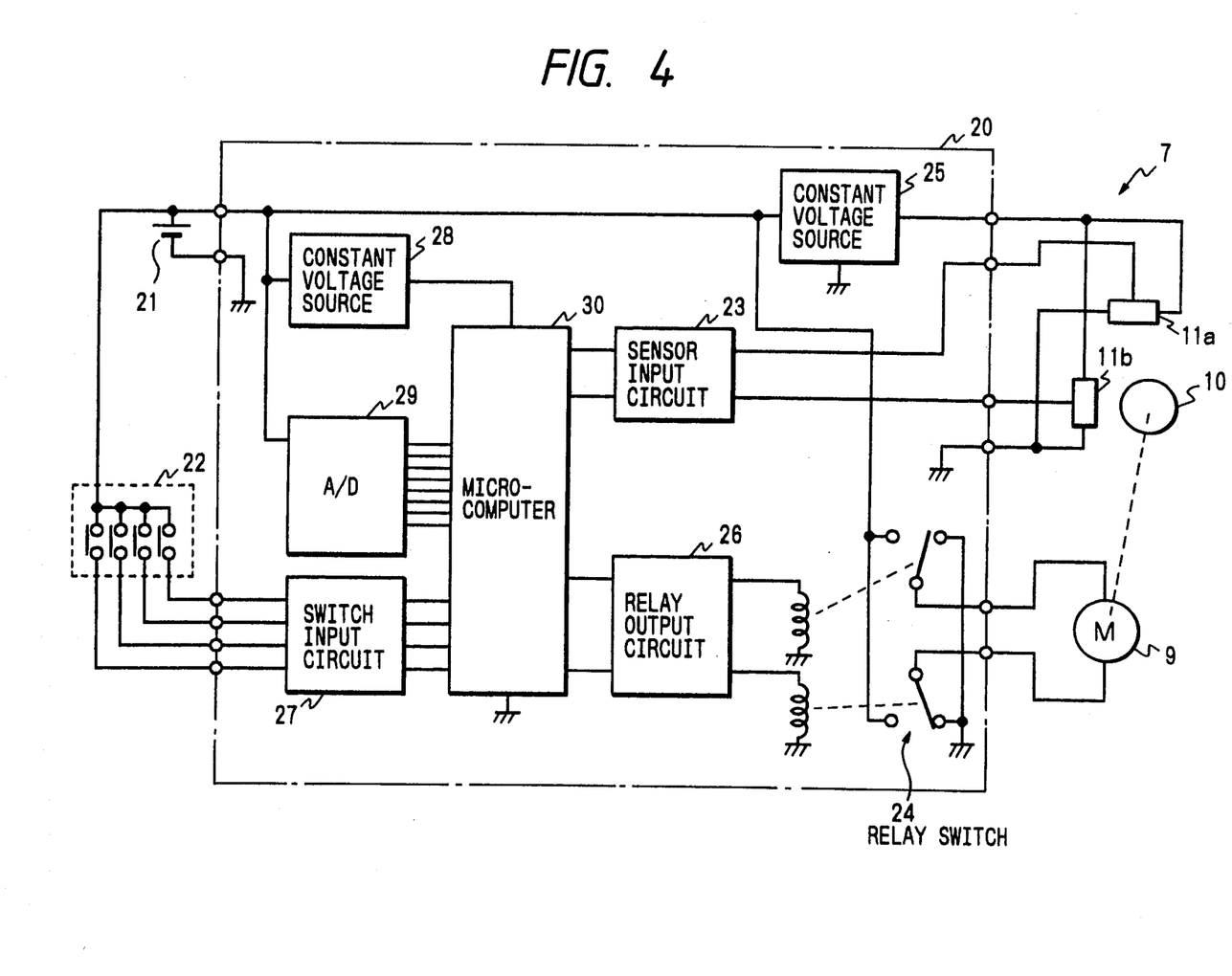
FIG. 4 is a block diagram showing the overall arrangement of a first embodiment of a safety device according to the invention.

FIG. 4 is a block diagram showing the overall arrangement of a first embodiment of a safety device constructed according to the invention. The above-described power window drive section 7 is connected to a control unit 20, which is implemented with a microcomputer 30. The Hall elements 11a and 11b of the pulse signal generator 11 are connected through a sensor input circuit 23 to the microcomputer 30, where the inputted pulse signals are utilized to detect both the speed of rotation of the motor 9 and the direction of rotation of the motor 9. The motor 9, which is the drive source of the window glass moving mechanism, is connected through a relay switch 24 to a power source 21 on the vehicle. The relay switch 24 is connected through a relay output circuit 26 to the microcomputer 30. The direction of rotation of the motor 9 can be changed by operating the relay switch 24 under the control of the microcomputer 30.

The microcomputer 30 is further connected through a switch input circuit 27 to a function switch 22 used to choose between an automatic window operation and a manual window operation, and between a window opening operation and a window closing operation. The power source 21 is connected through a constant voltage source 28 and an A/D (analog-to-digital) converter 29 to the microcomputer 30.

Figure 1:
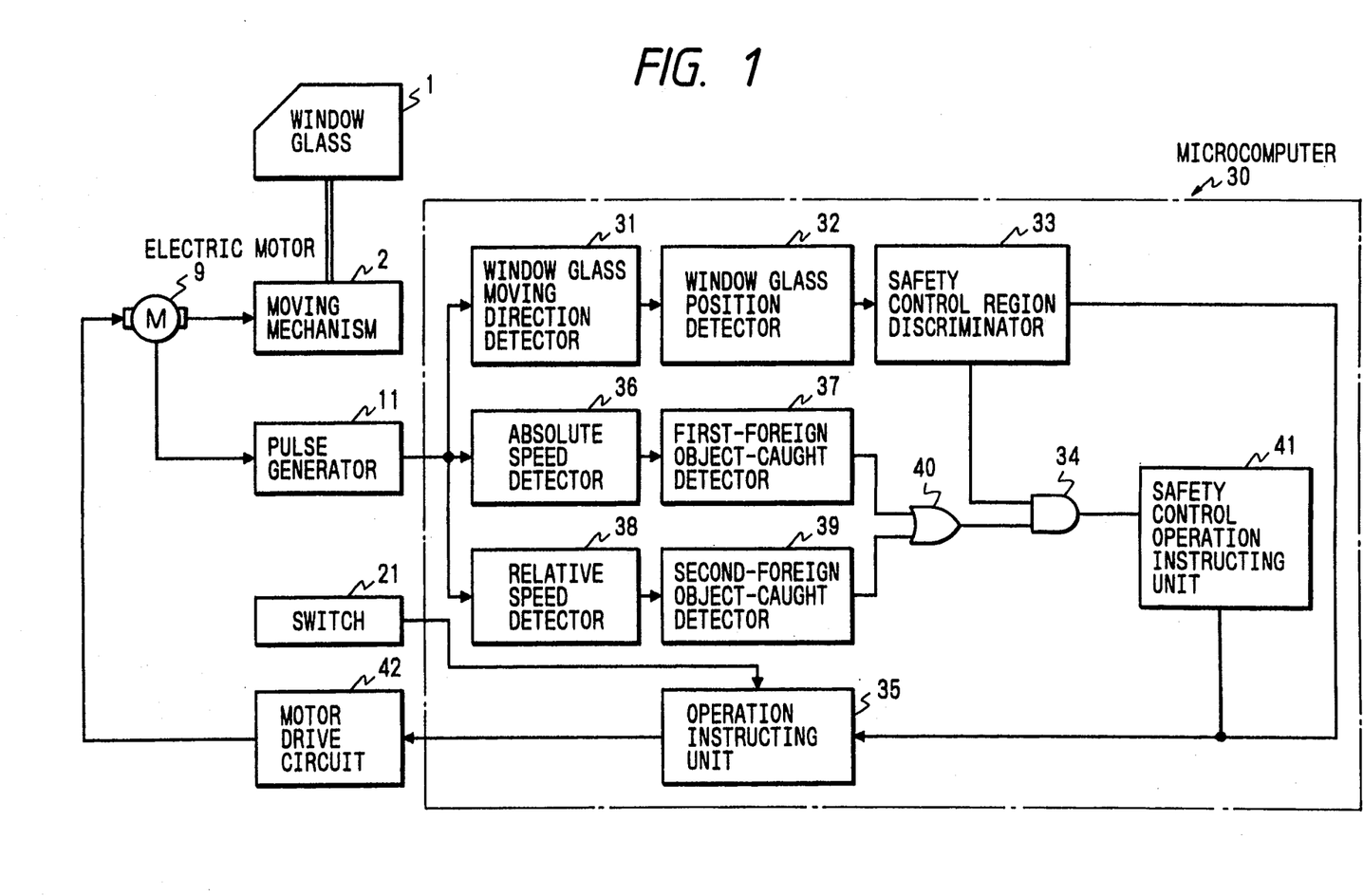
FIG. 1 is a block diagram for a description of the functions of a microcomputer employed in a safety device for a power window according to the invention.

FIG. 1 is a block diagram showing the functions of the microcomputer 30. The microcomputer 30, as shown in FIG. 1, has two systems: the first system is used to detect a safety control region from the degree of opening or closing of the window, and the second system is used to detect when a foreign object is caught between the window glass and the sash.

Figure 5A:
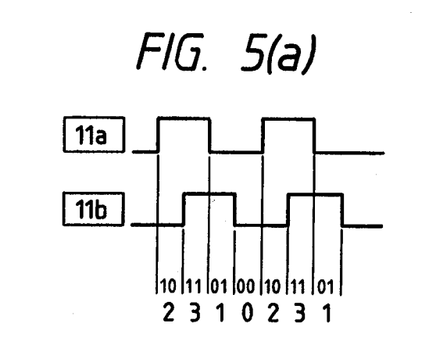
FIGS. 5(a) and 5(b) are explanatory diagrams showing pulse signals and their two-bit values for a description of a method of detecting a direction of movement of a window glass in accordance with the invention.
Figure 5B:
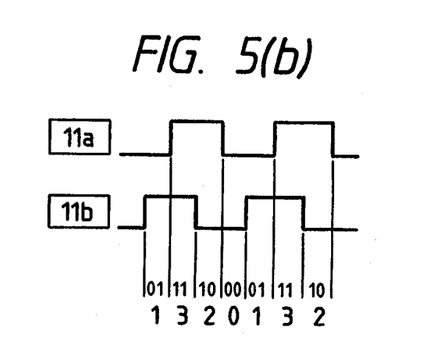

The first system has means 31 for detecting the direction of movement of the window glass. The window glass moving direction detector 31 binary encodes the output pulse signals of the pair of Hall elements 11a and 11b to obtain a two-bit signal as shown in FIG. 5. The periodic variation of the two-bit signal is detected to determine the direction of rotation of the motor 9, and accordingly a window opening or closing direction. For instance in the case where the two-bit signal changes states in the order of "2", "3", "1", "0" as shown in FIG. 5(a), the motor is rotating in the forward direction, and in the case where the two-bit signal changes states in the order of "1", "3", "2", "0" as shown in FIG. 5(b), the motor is rotating in the reverse direction.

A window glass position detector 32 for detecting the position of the window glass is formed by an up/down counter, for instance. The counter operates as follows: First, the count value is set to "0" with the window fully closed. Under this condition, the counter counts pulses of the pulse signal in the negative direction when the motor is rotated in the forward direction, and counts pulses of the pulse signal in the positive direction when the motor is rotated in the reverse direction, whereby the current position of the window glass can be detected from the count value.

A safety control region discriminator 33, receiving the output of the window glass position detector 32, discriminates the opening/closing region of the window glass during the period of time which elapses from the time instant the window is fully opened until the time instant immediately before the window is closed, so that safety control can be carried out only when this region is detected. That is, immediately before the window is closed, the window glass 1 is brought into contact with the sash 8, thus providing a contact resistance. This contact resistance may be mistaken for a foreign object being caught between the window glass and the sash. In order to eliminate such erroneous detection, the safety control region discriminator 33 is provided. In this embodiment, as shown in FIG. 2, about 90% of the region which the window glass covers when the window is fully opened is employed as the safety control region.

The output of the safety control region discriminator 33 is applied to one of the input terminals of an AND gate 34, and also to the operation instructing unit 35.

On the other hand, the second system used to detect when a foreign object is caught in the window includes the absolute speed detector 36 and the relative speed detector 38.

The absolute speed detector 36 detects the period of time which elapses from the time instant the switch is turned on until the rise of the subsequent pulse of the pulse signal, or the time interval between the rises of successive pulses of the pulse signal, thereby to determine whether or not the speed of rotation of the motor moving the window glass, i.e., the window opening or closing speed, is higher than a predetermined reference value. When this absolute speed is found to be lower than the reference value, the first foreign-object-caught detector 37 determines that a foreign object has been caught in the window. In this embodiment, when the speed of rotation of the motor 9 is 20 ms/revolution or less, it is determined that a foreign object has been caught in the window.

The relative speed detector 38 detects time intervals between successive pulse signals, and obtains the relative ratio of the time intervals to detect the change in speed of the window opening or closing operation of the motor, i.e., the relative speed thereof. When this relative speed is lower than a predetermined value, the second foreign-object-caught detector 39 determines that a foreign object has been caught in the window. In this embodiment, when the relative speed decreases 10% or more, it is determined that a foreign object has been caught in the window.

The outputs of the first and second foreign-object-caught detectors 37 and 39 are applied to the input terminals of an OR gate 40, the output of which is applied to the other input terminal of the above-described AND gate 34.

The output of the AND gate 34 is applied to a safety control operation instructing unit 41. Upon reception of a foreign-object-caught detection signal, the safety control operation instructing unit 41 controls an operation instructing unit 35 to perform a safety control operation. In this embodiment, control is carried out in such a manner that the window glass is moved 12 cm in the window opening direction.

It goes without saying that the operation instructing unit 35 is able to rotate the motor 9 in the forward direction or in the reverse direction in response to a signal from the function switch 22. The output of the operation instructing unit 35 is applied to a motor drive circuit 42 to control the rotation of the motor 9.

Figure 6:
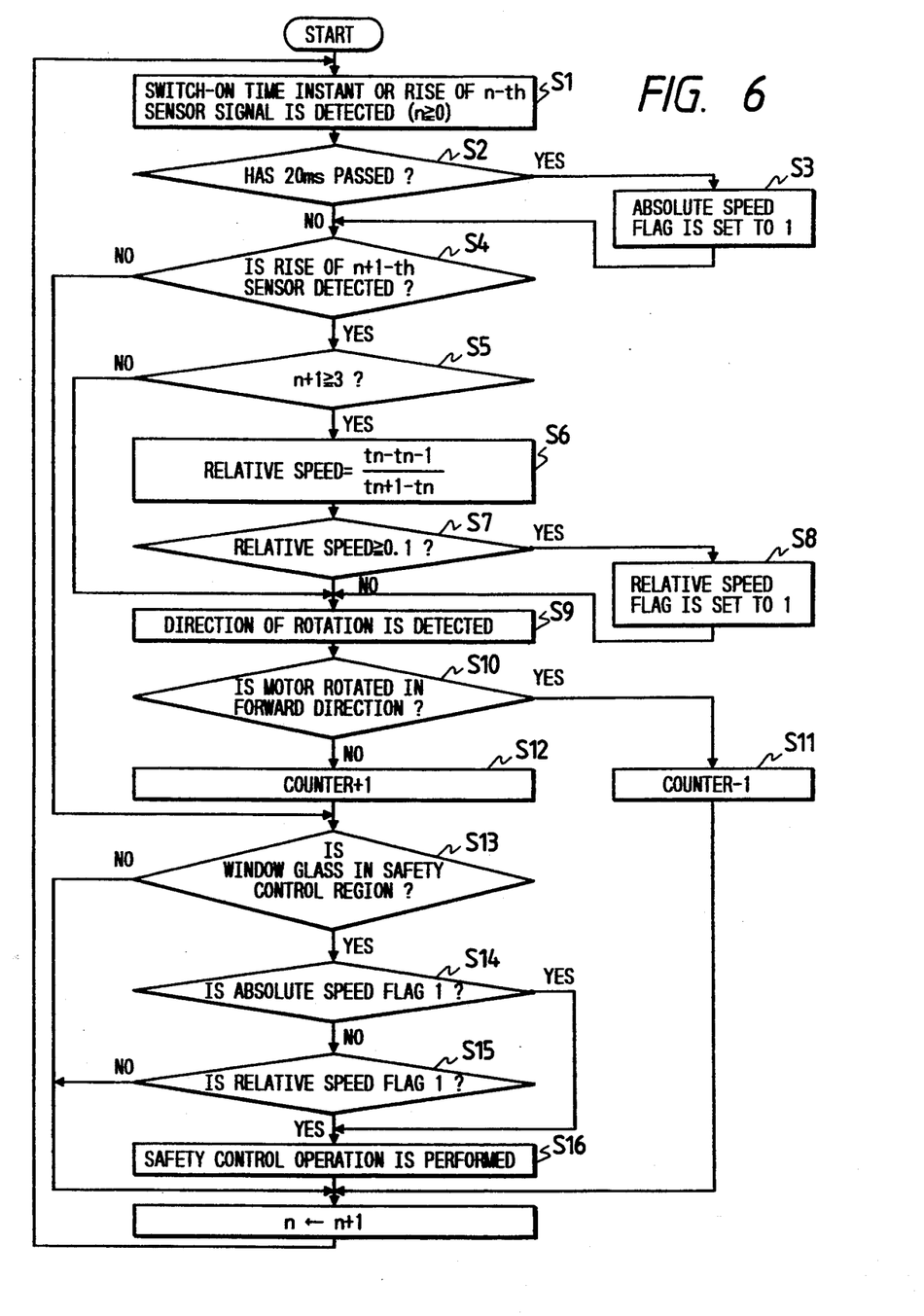
FIG. 6 is a flowchart for a description of essential operating steps of the safety control operation according to the invention.

The operation of the safety device constructed as described above will be described with reference to the flowchart of FIG. 6. When the switch 22 is turned on, this switch-on time instant is detected (Step S1). As the motor 9 rotates, the Hall elements 11a and 11b of the pulse generating unit 11 apply pulse signals to the microcomputer 30. The absolute speed detector 36 detects whether or not 20 ms has passed until the rise of the first subsequent (n=1) pulse of the pulse signal is detected (Step S2) from the detection of the switch being turned on (Step S1). When it is determined that 20 ms has passed, the first foreign-object-caught detector 37 determines that the absolute speed of the window opening or closing operation of the motor is lower than the reference value, therefore detects the fact that a foreign object is caught in the window, and sets an absolute speed flag (Step S3).

On the other hand, upon detection of the rise of the first subsequent pulse of the pulse signal (Step S4), the relative speed detector 38 attempts to detect the relative speed; however, no relative speed is detected because, at this time instant, $(n+1) \geq 3$ has not been established (Step S5). Upon detection of the second pulse of the pulse signal, still no relative speed is detected. However, when the third pulse of the pulse signal is detected, the time interval between the rise of the first pulse of the pulse signal and the rise of the second pulse of the pulse signal is compared with the time interval between the rise of the second pulse signal and the third pulse signal; that is, the ratio $(t_2-t_1)/(t_3-t_2)$ is calculated to obtain the relative speed of the window opening or closing operation of the motor (Step S6). The second foreign-object-caught detector 39 determines whether or not the relative speed thus detected has decreased by 10% or more (Step S7), and sets a relative speed flag when the result of determination is "Yes" (Step S8).

Similarly, for every detection of the n-th pulse of the pulse signal (where $(n+1) \geq 3$), the ratio of time intervals between pulse signals $(t_n-t_{n-1})/(t_{n+1}-t_n)$ is calculated to obtain the relative speed, and it is determined whether or not the relative speed has decreased (Step S6).

The window glass moving (opening or closing) direction detector 31 uses the output pulse signals of the Hall elements 11a and 11b to detect the direction of rotation of the motor 9, namely, the window glass moving direction (Step S9). The window glass position detector 32 determines from the window glass moving direction thus detected whether the motor is rotating in the forward direction or in the reverse direction (Step S10). When it is determined that the motor is rotating in the forward direction, the counter is decremented by one (1) (Step S11), whereas when the motor rotates in the reversed direction, the counter is incremented by one (1) (Step S12).

Next, the safety control region discriminator 33 determines from the contents of the counter whether the window glass is in the safety control region (Step S13), and applies a signal to the AND gate 34 when it is in the safety control region.

On the other hand, the absolute speed detection signal or the relative speed detection signal is applied through the OR gate 40 to the AND gate 34, and it passes through the AND gate 34 when the output signal of the safety control region discriminator 33 is present, and thus is applied to the safety control operation instructing unit 41. The latter determines whether or not the absolute speed flag has been set (Step S14), and then determines whether or not the relative speed flag has been set (Step S15). When one of the flags has been set, the safety control operation instructing unit 41 determines that a foreign object has been caught in the window, and activates the operating instructing unit 35 to perform a safety control operation (Step S16). In the safety control operation, the microcomputer 30 controls the relay output circuit 26 to operate the relay switch 24, that is, to control the motor drive circuit 42. As a result, the motor is rotated in the opposite direction to move the window glass a predetermined distance (12 cm) in the window opening direction and then stop the window, with the result that the foreign object is released from the window.

Figure 7:
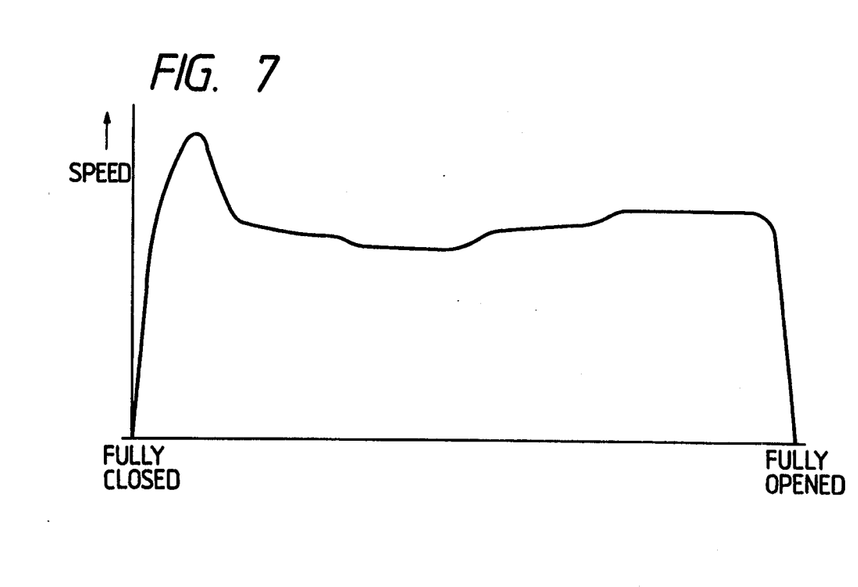
FIG. 7 is a graphical representation indicating the characteristic of absolute speed in a window glass moving operation effected by the motor.

FIG. 7 shows an example of the variation in absolute speed of the window glass moving operation performed by the motor during the period of time which elapses from the time instant the window is fully opened until the time instant it is fully closed. As is seen from FIG. 7, the absolute speed is maintained substantially constant; however, the absolute speed depends on the particular vehicle because of variations in loads such as the frictional forces between the window glass and sash and between the rail and the slider, as well as other external forces; that is, different absolute speeds are seen in different vehicles.

If it were determined only from a change (reduction) in the absolute speed of the window glass moving operation whether or not a foreign object is caught in the window, then the result of detection may be erroneous because of the above-described fact that different absolute speeds are seen in different vehicles. Hence, it is difficult to set the reference speed for detecting the change in absolute speed to a fixed, low value. On the other hand, if the reference used for detecting the change in absolute speed is allowed to have a large value, then the foreign object detecting sensitivity is lowered. Moreover, if only the relative speed of the window glass moving operation were used for the detecting operation, then a difficulty is involved in the instance where a soft material is caught in the window, in which case the absolute speed changes only moderately. In such an instance, sometimes the decrease in relative speed is not more than the reference value (e.g., about 10% of the absolute speed), and therefore detection of the foreign object is delayed, and sometimes may even be impossible.

In view of the foregoing, the above-described problems are solved by using the absolute speed and the relative speed in the window glass moving operation in combination. That is, in the invention, the reference value used for detecting absolute speed is set so as to prevent erroneous detection of a foreign object due to the above-described fact that different absolute speeds are seen in different vehicles. In this case, the detecting sensitivity may be lowered; however, when a foreign object is caught in the window, such state can be instantaneously detected from the abrupt variation in speed, i.e., from the relative speed. On the other hand, in the case where the foreign object caught in the window is soft, it is difficult to detect such a state from the relative speed. However, in this case, the absolute speed greatly changes, and therefore this state can be detected substantially instantaneously. Thus, according to the invention, the safety control operation is carried out quickly; that is, the power window is improved in safety.

As described above, with the safety device of the invention the safety control operation is carried out as follows: Both the absolute speed and the relative speed in the power window opening or closing operation are detected, and of the two speeds thus detected are utilized in combination for detection of a foreign object caught in the window. Hence, the inventive safety device eliminates the disadvantages accompanying the case where only the absolute speed is used for detection of a foreign object being caught in the window and the case where only the relatively speed is used for detection of the same, and it is detected substantially instantaneously when a foreign object is caught in the window. Thus, with the safety device of the invention, the safety control operation is achieved without delay.

Furthermore, with the inventive safety device, the position of the window glass is detected; that is, it is determined whether or not the window glass is in the safety control operation region, and the safety control operation is carried out only when the window glass is in the safety control operation region. Hence, an erroneous operation can be prevented which otherwise could occur when the window glass is in the vicinity of the closed position.

A second embodiment of the invention will now be described with reference to FIGS. 8, 9(a) and 9(b) of the drawings.

Figure 8:
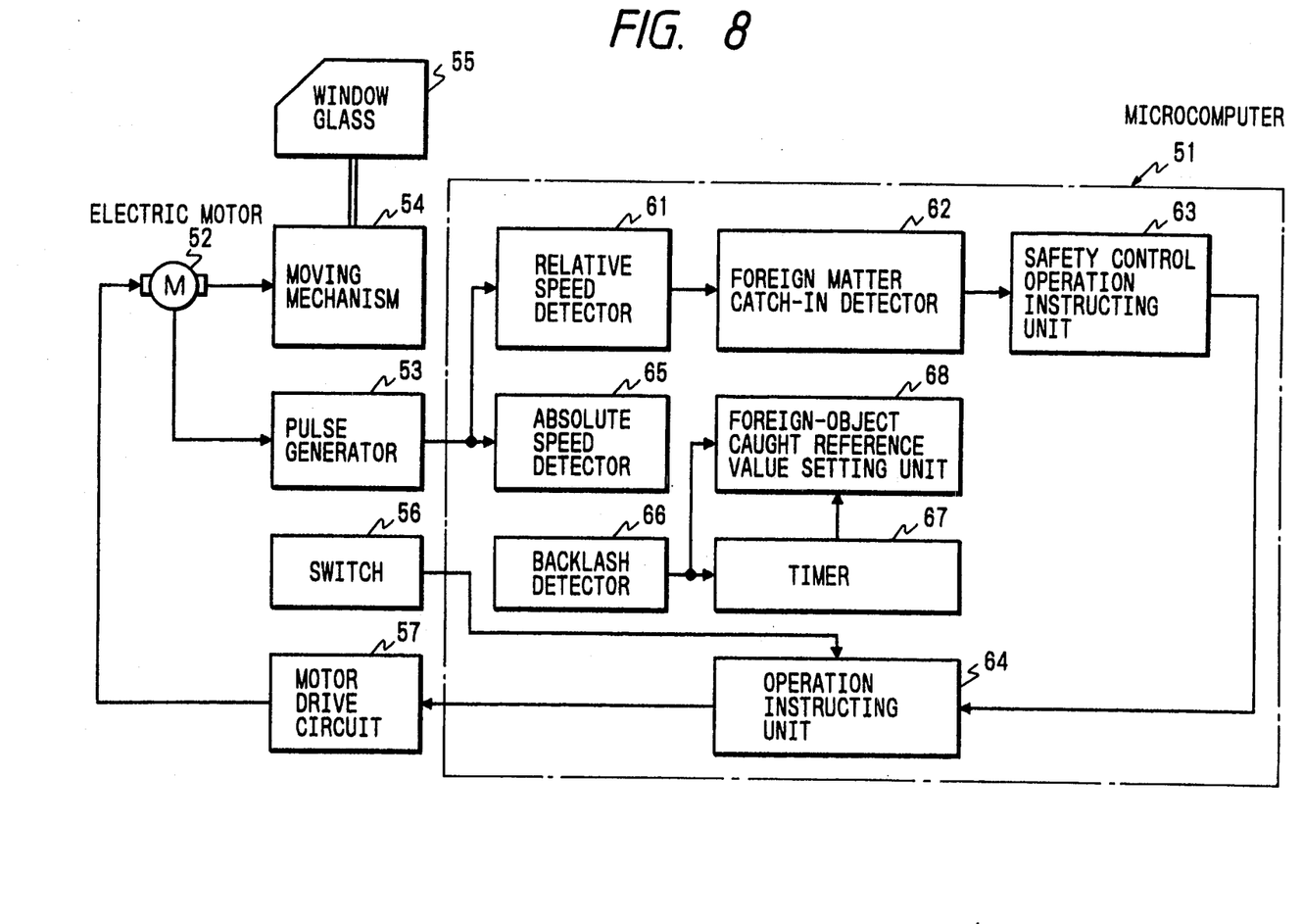
FIG. 8 is a block diagram showing essential functions of a safety device for a power window according to a second embodiment of the invention.

FIG. 8 is a block diagram showing essential circuit elements of a safety device for a power window according to the second embodiment of the invention. In FIG. 8, reference numeral 51 designates a microcomputer for performing safety control, to which a pulse signal is applied by a pulse signal generator 53 coupled to an electric motor 52, which is a drive source for the power window. The motor 52 drives a window glass operating mechanism 54 including a gear train so that a window glass 55 is moved vertically to open or close the window. A function switch 56 is provided to select between a window opening and a window closing operation, thus providing a selection signal. The selection signal is applied to the microcomputer 51. The microcomputer 51 outputs a control signal to control a motor drive circuit 57 adapted to control the direction of rotation of the motor 52.

The pulse signal generator 53 is implemented in the same manner as in the first embodiment, as shown in FIG. 1.

The microcomputer 51 includes a relative speed detector 61, which is connected to a foreign-object-caught detector 62. The relative speed detector 61 operates to detect the time interval between pulses of the pulse signal outputted by the pulse generator 63, and to obtain the ratio of consecutive time intervals, thus to detect the variation in speed of the window opening or closing operation, i.e., the relative speed thereof. When the relative speed is found to be lower than a predetermined value, the foreign-object-caught detector 62 determines that a foreign object is caught in the window. In this embodiment, when the relative speed has decreased at least 10%, it is determined that a foreign object is caught in the window, and a detection signal is applied to a safety control operation instructing unit 63.

Upon reception of the detection signal, the safety control operation instructing unit 63 controls an operation instructing unit 64 to perform a safety control operation. In this embodiment, the window glass is moved 12 cm from its current position in the window opening direction.

The microcomputer further includes an absolute speed detector 65. The detector 65 detects the period of the pulse signals outputted by the pulse signal generator 53, thereby to detect the speed of rotation of the motor 52 as the absolute speed of the window opening and closing operation. Backlash detector 66 detects both the time instant when the absolute speed thus detected exceeds a predetermined value and the time instant when it becomes lower than the predetermined value again. The time interval between these two time instants is detected as a period of time in which the backlash occurs (hereinafter referred to as "backlash time (or state)", when applicable). A timer 67 detects the lapse of a predetermined period of time from the termination of the backlash, that is, from the time instant when the absolute speed becomes lower than the predetermined value, to output a signal. Foreign-object-caught reference value setting unit 68 set the reference value provided for detection of a foreign object being caught in the window when the backlash detector 66 detects backlash, and when it receives the output signal (concerning the predetermined period of time) of the timer 67. In this embodiment, the reference value is changed to a large negative value in response to the output signal of the backlash detector 66, and, in response to the output signal of the timer 67, a reference value which is lower by 10% than the relative speed is set 20% lower.

The safety device thus constructed operates as follows:

As the motor 52 rotates, the pulse signal generator 53 applies pulse signals to the microcomputer 51, whereupon the relative speed detector 61 detects the relative speed of the motor. When the relative speed falls below the reference value, the foreign-object-caught detector 62 determines that a foreign object is caught between the window glass and the sash, thus obstructing the movement of the window glass, and outputs the foreign-object-caught detection signal, which is applied to the safety control operation instructing unit 63. Upon reception of the detection signal, the safety control operation instructing unit 63 applies an instruction signal for safety control operation to the operation instructing unit 64. As a result, the latter controls the rotation of the motor 52 through the motor drive circuit 57 so that the movement of the window glass in the window closing direction is stopped, or it is moved in the window opening direction.

Figure 9A:
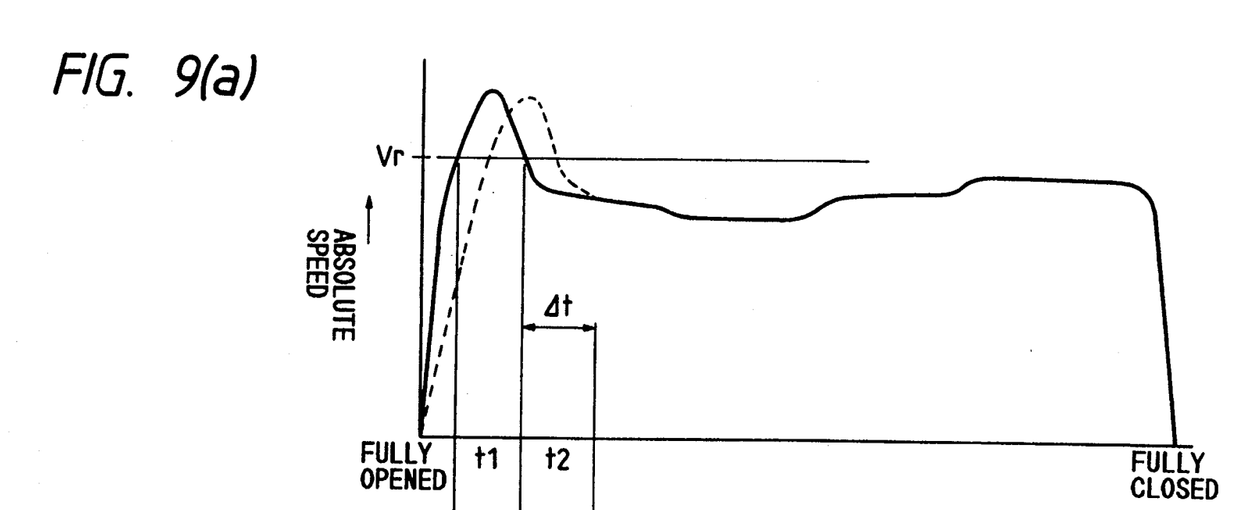
FIGS. 9(a) and 9(b) are diagrams showing relationships between the absolute speed and the relative speed of an electric motor in a drive section of a power window to which the technical concept of the second embodiment of the invention is applied.

FIG. 9(a) indicates the variation in absolute speed of the motor 52 which occurs during the period of time which elapses from the time instant that the window is fully opened until it is fully closed. As shown in FIG. 9(a), at the start of the motor, the absolute speed is abruptly increased because backlash occurs in the window opening and closing mechanism. Immediately after this phenomenon, the backlash is eliminated, and the load of the motor is increased abruptly, and therefore the absolute speed abruptly decreases and thereafter maintained substantially constant.

Figure 9B:
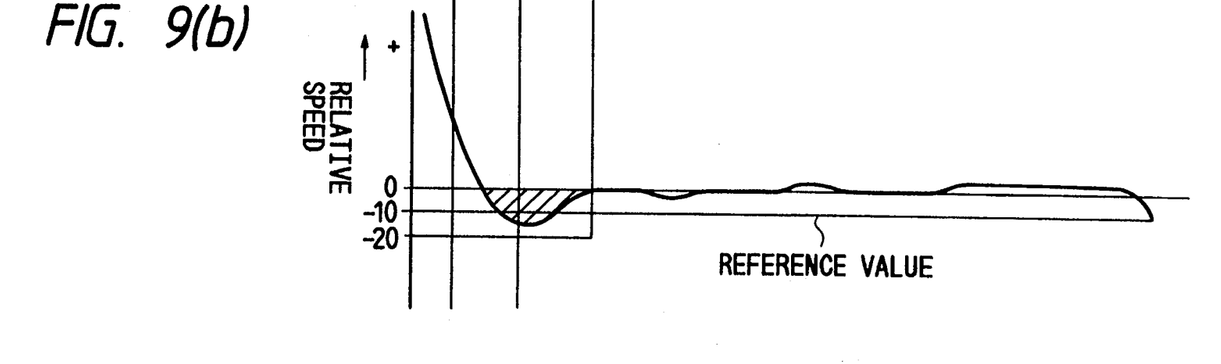

In correspondence to the above-described variation in absolute speed, the variation in relative speed is as shown of FIG. 9(b). At the start of the motor, the relative speed is large in the positive direction, gradually decreasing during the backlash time. When the backlash time is over, the relative speed becomes large in the negative direction, and thereafter becomes substantially zero (0) because of the stabilization of the absolute speed. When a foreign object is caught in the window, the relative speed is increased in the negative direction.

If only the relative speed were employed to determine whether or not a foreign object is caught in the window, then a decrease in relative speed due to the backlash occurring immediately after the start of the motor (the decrease corresponding to the region shaded in FIG. 9(b)) could be erroneously detected as a foreign object being caught in the window. However, in this embodiment, a reference value $V_r$ is established for the absolute speed. That is, the absolute speed detected is compared with the reference speed, so that an increase in absolute speed occurring during the backlash time is positively detected; that is, it is determined from the increase in absolute speed that backlash has occurred. Therefore, at the time instant $t_1$ when the backlash detector 66 detects backlash, the foreign-object-caught reference value setting unit 68 changes the reference value to the large negative value, and therefore the foreign-object-caught detector 62 outputs no signal, forcibly inhibiting the safety control operation. The inhibition of the safety control operation during the times when backlash is occurring causes no problem in practice because the probability is considerably low that a foreign object will be caught in the window during that period.

Thereafter, the absolute speed decreases, becoming lower than the reference value $V_r$ at the time instant $t_2$. The timer 67 detects the lapse of a predetermined period of time $\Delta t$ from the time instant $t_2$. For this period of time, the foreign-object-caught reference value setting unit 68 changes the reference value of the foreign-object-caught detector 62 to a value lower by 20% than the standard reference value. Hence, even in the case where, as indicated by the shaded region in FIG. 9(b), the relative speed decreases as the load increases after the occurrence of backlash, the decrease will not be detected as the occurrence of a foreign object being caught in the window; that is, erroneous performance of the safety control operation is prevented.

If a foreign object is caught in the window during the predetermined period of time $\Delta t$, then the relative speed decreases abruptly, becoming lower by about 20% than the standard reference value. This decrease is detected by the foreign-object-caught detector 62, and the detector 62 applies the detection signal to the safety control operation instructing unit 63. Thus, the safety control operation is carried out.

In the above-described embodiment, the reference value of the foreign-object-caught detector 62 is lowered for the period of time $\Delta t$ from the termination of the backlash. However, the safety device may be modified so that, instead of the timer 67, a distance counter is employed whereby the foreign-object-caught detecting reference value is maintained changed until the window glass moves a predetermined distance after the detection of the backlash.

Further, in the above-described embodiment the backlash state is detected from the absolute speed. However, the backlash state may be detected, for example, with a load sensor for detecting the motor torque or the like provided in the drive section.

In addition, the safety device may be modified so that the switching on of the drive source is detected, and in response to this detection the detecting reference value is lowered, or the safety control operation is stopped. In this case, the drive source should be designed so that lowering the reference value or stopping the safety control operation can be performed with a sufficiently long time margin because the backlash, as indicated by the broken line in FIG. 9(a), changes with time and is affected by changes in ambient temperature, the supply voltage, etc. On the other hand, in the above-described embodiment, backlash is detected to lower the reference value or stop the safety control operation, and therefore the predetermined period of time $\Delta t$ can be short, which makes it possible to positively detect when a foreign object is caught in the window immediately after the start of the motor. Thus, the safety device of the invention ensures excellent safety control of the power window.

As described above, in the safety device of the invention, the start of the drive source adapted to open and close the window is detected, and, for the predetermined period of time, the safety control operation is stopped and the detecting reference value is lowered. Hence, when the window opening and closing speed is utilized to detect whether or not a foreign object is caught in the window, erroneous detection due to backlash in the drive section is prevented, and therefore the safety control operation is carried out without obstructing the normal operation of the power window.

What is claimed is:

1. In a safety device for a power window of a vehicle in which a speed of operation of a drive source adapted to open and close said power window is detected by comparing said speed of operation with a reference value to determine whether or not a foreign object is caught in said window, thereby to perform a safety control operation, wherein the improvement comprises:

means for detecting the occurrence of backlash in said drive source; and means for suppressing said safety control operation when backlash occurs in said drive source, and for decreasing said reference value for a predetermined period of time from a time of termination of said backlash.

2. The safety device as claimed in claim 1, wherein said means for detecting the occurrence of backlash comprises means for detecting a time instant when an absolute value of said speed of operation exceeds a predetermined value and for detecting a subsequent time instant when said absolute value of said speed of operation falls below said predetermined value.

3. In a safety device for a power window of a vehicle in which a speed of operation of a drive source adapted to open and close said power window is detected by comparing said speed of operation with a reference value to determine whether or not a foreign object is caught in said window, thereby to perform a safety control operation, wherein the improvement comprises:

means for detecting the occurrence of backlash in said drive source; and means for suppressing said safety control operation while backlash is occurring in said drive source, and for decreasing said reference value until after said window glass has moved a predetermined distance.

4. The safety device as claimed in claim 3, wherein said means for detecting the occurrence of backlash comprises means for detecting a time instant when an absolute value of said speed of operation exceeds and predetermined value and for detecting a subsequent time instant when said absolute value of said speed of operation falls below said predetermined value.

5. In a method for operating a power window of a vehicle in which a speed of operation of a drive source adapted to open and close said power window is detected by comparing said speed of operation with a reference value to determine whether or not a foreign object is caught in said window, thereby to perform a safety control operation, wherein the improvement comprises the steps of:

detecting the occurrence of backlash in said drive source;

suppressing said safety control operation when backlash occurs in said drive source; and decreasing said reference value for a predetermined period of time from a time of termination of said backlash.

6. The method as claimed in claim 5, wherein said step of detecting the occurrence of backlash comprises:

detecting a time instant when an absolute value of said speed of operation exceeds a predetermined value; and detecting a subsequent time instant when said absolute value of said speed of operation falls below said predetermined value.

7. In a method for operating a power window of a vehicle in which a speed of operation of a drive source adapted to open and close said power window is detected by comparing said speed of operation with a reference value to determine whether or not a foreign object is caught in said window, thereby to perform a safety control operation, wherein the improvement comprises the steps of:

detecting the occurrence of backlash in said drive source;

suppressing said safety control operation while backlash is occurring in said drive source; and decreasing said reference value until after said window glass has moved a predetermined distance.

8. The method as claimed in claim 7, wherein said step of detecting the occurrence of backlash comprises:

detecting a time instant when an absolute value of said speed of operation exceeds a predetermined value; and detecting a subsequent time instant when said absolute value of said speed of operation falls below said predetermined value.

* * * * *